United States Patent
Lipson et al.

(10) Patent No.: US 11,658,298 B2
(45) Date of Patent: May 23, 2023

(54) STABILIZED LITHIUM METAL OXIDE ELECTRODE MATERIAL AND METHOD OF PREPARATION

(71) Applicant: UCHICAGO ARGONNE, LLC, Chicago, IL (US)

(72) Inventors: Albert L. Lipson, Forest Park, IL (US); Jessica L. Durham, Frankfort, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 414 days.

(21) Appl. No.: 16/877,925

(22) Filed: May 19, 2020

(65) Prior Publication Data

US 2021/0367235 A1    Nov. 25, 2021

(51) Int. Cl.
*H01M 4/525* (2010.01)
*H01M 4/36* (2006.01)
*H01M 4/04* (2006.01)
*H01M 10/0525* (2010.01)
*H01M 10/0568* (2010.01)
*H01M 10/0569* (2010.01)
*H01M 50/40* (2021.01)

(52) U.S. Cl.
CPC ......... *H01M 4/525* (2013.01); *H01M 4/0471* (2013.01); *H01M 4/366* (2013.01); *H01M 10/0525* (2013.01); *H01M 10/0568* (2013.01); *H01M 10/0569* (2013.01); *H01M 50/40* (2021.01); *H01M 2300/002* (2013.01)

(58) Field of Classification Search
None
See application file for complete search history.

(56) References Cited

U.S. PATENT DOCUMENTS

| 2018/0108940 A1* | 4/2018 | Kwon | C01G 53/50 |
| 2018/0123187 A1* | 5/2018 | Ho | H01M 50/543 |
| 2020/0251724 A1* | 8/2020 | Kim | H01M 4/525 |

OTHER PUBLICATIONS

Hou, P. et al., Design, Preparation and Properties of Core-Shelled Li{[NiyCo1—2yMny](1-x)} core {[Ni1/2Mn1/2]x} shell O2 ((0<x<0.2m 6y+3x-6xy=2) as High Performance Cathode for Li-Ion Battery, Electrochimica Acta 133, 589-596 (2014).

Hu, G. et al., Mg—Al—B Co-Substitution LiNi0.5Co0.2Mn0.3O2 Cathode Materials With Improved Cycling Performance for Lithium-Ion Battery Under High Cutoff Voltage, Electrochimica Acta 190, 264-275 (2016).

(Continued)

*Primary Examiner* — Christopher P Domone
(74) *Attorney, Agent, or Firm* — Olson & Cepuritis, Ltd.

(57) ABSTRACT

A stabilized lithium metal oxide cathode material comprises microparticles of lithium metal oxide in which individual particles thereof a core of lithium metal oxide and a coating of a different lithium metal oxide surrounding the core. There is an interface layer between the cores and the coatings in which there are gradients of metal ions in the direction of coating to core. The materials are made by a three stage process involving coprecipitating precursor metal hydroxide core particles at a controlled pH; coprecipitating a different metal hydroxide coating on the particles without controlling the pH; and then calcining the resulting coated precursor particles with lithium hydroxide to form the stabilized lithium metal oxide material.

13 Claims, 6 Drawing Sheets
(5 of 6 Drawing Sheet(s) Filed in Color)

(56) References Cited

OTHER PUBLICATIONS

Hua, W. et al., Na-Doped Ni-Rich LiNi0.5Co0.2Mn0.3O2 Cathode Material With Both High Rate Capability and High Tap Density for Lithium Ion Batteries, Dalton Transactions 43, 14824-14832 (2014).
Huang, Y. et al., Tellurium Surface Doping to Enhance the Structural Stability and Electrochemical Performance of Layered Ni-Rich Cathodes, ACS Applied Materials & Interfaces 11, 40022-40033 (2019).
Huang, Z. et al., Effect of Mg Doping on the Structural and Electrochemical Performance of LiNi0.6Co0.2Mn0.2O2 Cathode Materials, Electrochimica Acta 182, 795-802 (2015).
Jiang, Y. et al., Full-Gradient Structured LiNi0.8Co0.1Mn0.1O2 Cathode Material With Improved Rate and Cycle Performance for Lithium Ion Batteries, Electrochimica Acta 309, 74-85 (2019).
Jow et al. (Eds., Electrolytes for Lithium and Lithium-Ion Batteries, Chapter 1, pp. 1-92, Springer, New York, NY (2014).
Jow et al. (Eds., Electrolytes for Lithium and Lithium-Ion Batteries, Chapter 2, pp. 93-166, Springer, New York, NY (2014).
Jow et al. (Eds., Electrolytes for Lithium and Lithium-Ion Batteries, Chapter 3, pp. 167-182, Springer, New York, NY (2014).
Jow et al. (Eds., Electrolytes for Lithium and Lithium-Ion Batteries, Chapter 4 pp. 209-226, Springer, New York, NY (2014).
Ko, H. S. et al., Co/Ti Co-Substituted Layered LiNiO2 Prepared Using a Concentration Gradient Method as an Effective Cathode Material for Li-Ion Batteries, Journal of Power Sources 372, 107-115 (2017).
Lee, Y. et al., Compositional Core-Shell Design by Nickel Leaching on the Surface of Ni-Rich Cathode Materials for Advanced High-Energy and Safe Rechargeable Batteries, Journal of Power Sources 400, 87-95 (2018).
Li, Y. et al., Synthesis of Full Concentration Gradient Cathode Studied by High Energy X-Ray Diffraction, Science Direct, Nano Energy 19, 522-531 (2016).
Lipson, A. L. et al., Improving the Thermal Stability of NMC 622 Li-Ion Battery Cathodes through Doping During Coprecipitation. ACS Appl. Mater. Interfaces 12, 18512-18518 (2020).

Long, B.R. et al., Enabling High-Energy, High-Voltage Lithium-Ion Cells: Standardization of Coin-Cell Assembly, Electrochemical Testing, and Evaluation of Full Cells, Journal Electrochemical Society 163 (14), A-2999-A3009 (2016).
Luo, W. et al., Synthesis, Characterization, and Thermal Stability of Li[Ni1/3Mn1/3Co1/3?z(MnMg)z/2]O2, Chemistry Materials 22, 5065-5073 (2010).
Luo, X. et al., Synthesis and Characterization of High Tap-Density Layered Li[Ni1/3Co1/3Mn1/3]O2 Cathode Material via Hydroxide Co-Precipitation, Journal of Power Sources 158, 654-658 (2006).
Noh, M. et al., Optimized Synthetic Conditions of LiNi0.5Co0.2Mn0.3O2 Cathode Materials for High Rate Lithium Batteries via Co-Precipitation Method, Journal of the Electrochemical Society 160, A105-A111 (2013).
Pang, W. K. et al., Effects of Fluorine and Chromium Doping on the Performance of Lithium-Rich Li1+XMO2 (M=Ni, Mn, Co) Positive Electrodes, Chemistry of Materials 29, 10299-10311 (2017).
Shi, J. L. et al., High-Thermal- and Air-Stability Cathode Material with Concentration-Gradient Buffer for Li-Ion Batteries. ACS Applied Materials & Interfaces 9, 42829-42835 (2017).
Sun, Y-K. et al., Novel Core: Shell-Structured Li[(Ni0.8Co0.2)0.8(Ni0.5Mn0.5)0.2]O2 via Coprecipitation as Positive Electrode Material for Lithium Secondary Batteries,The Journal of Physical Chemistry B 110, 6810-6815 (2006).
Sun, Y. K. et al., A Novel Concentration-Gradient Li Ni0.83Co0.07Mn0.10 O-2 Cathode Material for High-Energy Lithium-Ion Batteries, Journal of Materials Chemistry 21, 10108-10112 (2011).
Yang, H. et al., Simultaneously Dual Modification of Ni-Rich Layered Oxide Cathode for High-Energy Lithium-Ion Batteries, Advanced Functional Materials 29, 1808825 (2019).
Yoon, S. J. et al., Improved Performances of Li Ni0.65Co0.08Mn0.27 O-2 Cathode Material with Full Concentration Gradient for Li-Ion Batteries. Journal of The Electrochemical Society 162, A3059-A3063 (2015).
Zhu, L. et al., LiFePO4-Coated LiNi0.5Co0.2Mn0.3O2 Cathode Materials with Improved High Voltage Electrochemical Performance and Enhanced Safety for Lithium Ion Pouch Cells, Journal of The Electrochemical Society 166, A5437-A5444 (2019).

\* cited by examiner

STABILIZED LITHIUM METAL OXIDE ELECTRODE MATERIAL AND METHOD OF PREPARATION

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to stabilized cathode materials useful for lithium-based battery systems. More particularly, the invention relates to particulate layered lithium metal oxide materials that are stabilized by infusion of metal ions such as manganese and cobalt ions into the particles.

BACKGROUND

Currently there is a drive to reduce the amount of cobalt in layered lithium metal oxide cathode materials, such as lithium nickel manganese cobalt oxide (NMC) cathodes, in lithium-ion (Li-ion) batteries, while at the same time increasing the amount of Ni, to increase the capacity of the batteries. Co is the most expensive of the transition metals used in Li-ion batteries. In addition, approximately half the Co supply is currently produced in the Democratic Republic of the Congo wherein there are issues concerning the use of child labor and poor working conditions. If Co can successfully be reduced, while at the same time increasing battery capacity, the social and manufacturing cost problems surrounding Co use can be ameliorated. However, increasing nickel and decreasing cobalt in layered NMC electrodes come with some deleterious side effects, which include reduced cycle life, and decreased phase stability of the charged cathode material.

Many strategies have been employed to address the problems associated with decreasing cobalt content and increasing Ni content. These include coating and doping the NMC cathode material with various materials and elements. Coatings and dopants can be added during the coprecipitation process used to make the Li-ion battery cathode precursor, before calcination, or after calcination. A typical coprecipitation process uses a mixture of transition metal (e.g., Ni, Mn, Co) sulfates, sodium hydroxide solution as the precipitating agent, and ammonium hydroxide solution as a chelating agent. These solutions are pumped continuously into a continuous stirred tank reactor in which the temperature and pH are kept constant. This produces a spherical metal hydroxide precursor composition with a desired particle size, which is then further processed to form the NMC cathode material.

One promising strategy to stabilize high nickel content NMC is to create compositional gradients in the final structure of the particles of NMC. This typically must be done using a batch coprecipitation process where the composition of the feed transition metal solution varies with time while holding the pH at a constant value. There are many different variations possible in such processes including creation of full concentration gradients, core-gradients, and core-shell materials. It is very difficult to create gradient materials in a continuous process, however, which is preferred for commercial production. Core-shell type materials can be made efficiently, but they do not provide as much stabilizing benefit.

In view of these issues, there in an ongoing need for new lithium metal oxide cathode materials. The materials and methods described herein address this need.

SUMMARY

A stabilized lithium metal oxide (LMO) cathode material comprises microparticles of LMO in which individual particles thereof have a core of one LMO composition (preferably a nickel-containing LMO) and a coating of a different LMO composition surrounding the core. There is a transitional interface layer between the core and the coating in which there is a blend of metal ions from the core and the coating.

The materials are made by a three stage process involving coprecipitating precursor metal hydroxide (MOH) core particles comprising a first metal hydroxide composition (e.g., and MOH comprising Ni, Mn, Co, or a combination of two or more thereof) at a controlled pH; coprecipitating a MOH coating with a different metal hydroxide composition (e.g., an MOH comprising Mn in combination with Co and/or another metal ion) on the core particles without controlling the pH; and then calcining the resulting coated precursor particles with lithium hydroxide to form the stabilized LMO material. During the coating stage, some of the metal ions from the coating composition penetrate into the cores of the particles. Mn that penetrates into the core precipitates non-uniformly so that there are concentric regions in the core where the Mn concentration varies slightly from the average Mn concentration in the core. These manganese variations are retained in the calcined lithium metal oxide products to some extent, depending on the calcining temperature. Higher calcining temperatures tend to even out the Mn distribution in the core.

As noted above, the process described herein produces stabilized lithium metal oxide cathode materials comprising a lithium metal oxide coating on LMO core particles. The stabilized lithium metal oxide particles preferably comprise greater than 60 mol % Ni based on total moles of transition metals in the material. The Mn content of the core particles preferably varies from the average Mn content by up to about +/−5 percent (e.g., +/−1 to 5%) in concentric regions (e.g. layers) in the core. Typically, the stabilized LMO has an average particle size of about 6 to about 15 μm (e.g., as determined by a particle size analysis method such as dynamic light scattering, laser diffraction, dynamic image analysis, or static image analysis), the coating is about 100 to about 500 nm thick at the surface, and there is a transitional interface region or layer of about 200 to about 500 nm between the bulk core and the coating. The interface comprises a blend of metal ions from the core and the coating, which can have an increasing gradient of Ni and decreasing gradients of Mn and Co concentrations in the direction from surface to core when Ni, Mn and Co are present in the stabilized MOH. Other metals can be included in the coating and the core, if desired.

Using the process described herein, high nickel-content materials, such as materials with the approximate empirical formula of $LiNi_{0.8}Mn_{0.1}Co_{0.1}O_2$ (NMC811) can be made, which have significantly improved cycling stability, capacity, and thermal stability when utilized as a cathode material in a lithium ion battery system compared to conventional, uncoated MOH comprising the same overall metal composition. It is believed that structural differences between the materials produced by the methods described herein compared to conventional high-Ni NMC materials are responsible for the improved properties.

The stabilized LMO cathode material (e.g., an NMC material) is formed from a three-stage process involving formation of metal hydroxide core (MOH core) precursor particles; coating the MOH core precursor particles with another metal hydroxide composition; and then calcining the coated metal hydroxide particles with lithium hydroxide to form the stabilized LMO material.

In the first stage of the process, core particles of a MOH (e.g., Ni—Mn—Co hydroxide) are formed by continuously adding aqueous hydroxide solutions (e.g., sodium and ammonium hydroxide), along with an aqueous solution of metal salts (e.g., sulfate salts such as nickel, manganese and cobalt sulfates) to a stirred reactor at a temperature of about 25 to 60° C., at hydroxide addition rates sufficient to maintain a constant pH of greater than or equal to 11 (e.g., pH 11.9). The MOH core particles precipitate and grow during an initial reaction period, and then reach steady state conditions. The initial solution of metal salts preferably comprises nickel, manganese, and cobalt ions in a target ratio for Ni-rich NMC product (Ni>60 mol % based on total moles of transition metal ions in the composition). After a desired average particle size is obtained for the precipitated MOH core particles (e.g., about 6 to about 15 μm), the hydroxide addition is halted. Preferably, the first stage is performed in a continuous stirred tank reactor (CSTR).

In the second stage, an aqueous coating solution comprising metal salts (e.g., Mn and Co salts (Mn/Co), such as Mn and Co sulfates), is continuously added to a stirring suspension of the MOH core particles without any further addition of hydroxide or pH control. The MOH core particles are porous and have a high interior pH. The added metals from the coating solution coprecipitate as a metal hydroxide on the surface of the MOH core particles, and also within the porous interior of the MOH core particles. The pH drops as the addition of the coating solution proceeds and metal hydroxide precipitates on the MOH cores. Typically, the addition of the coating solution is halted when the pH drops by a target value of about 0.1 to 1 pH units. Preferably, the second stage is performed in separate stirred batch reactors allowing the process to proceed semi-continuously.

The resulting product comprises particles having an MOH core with some added metal ions relative to the original core composition, and a thin (e.g., 100 to 500 nm) metal hydroxide coating having a different metal ion composition. Typically, only a relatively small amount (e.g., 1 to 3 mol %) of additional metal ions is added to the core particles during the coating process, so that the empirical formula of the coated product is very similar to the core particles before coating. There is also a thin (e.g., a few hundred nm) transitional region between the coating and the core having a blend of metal ions from the core and the coating, which can vary as gradients of the different metal ions from the direction of the surface to the core. In the case of nickel manganese cobalt hydroxide materials with a manganese cobalt hydroxide coating, the transitional region typically has an increasing gradient of Ni hydroxide and decreasing gradients of Mn and Co hydroxide concentrations in the direction from surface to core. The coated MOH precursor composition is then washed with water, isolated (e.g., by filtration), and dried.

The third stage of the process comprises mixing the dried coated MOH precursor with lithium hydroxide (e.g., LiOH hydrate at about one mole of Li per total moles of transition metals (e.g., Ni, Mn and Co), or up to 5 mol % excess Li). Next, the mixture is calcined under an oxygen-containing atmosphere at a temperature in the range of about 725 to 900° C. (preferably about 750 to about 800° C.) for about 4 to about 50 hours to form the stabilized LMO product.

In some embodiments, the coating solution can include one or more other metal that can precipitate under basic conditions, such as aluminum, titanium, zirconium, magnesium, and yttrium, in place of Co, Mn, or both Co and Mn, or in addition to Co and Mn. In some other embodiments, either Co or Mn can be omitted in the coating composition.

The following non-limiting embodiments of the materials and methods described herein are provided below to illustrate certain aspects and features of the compositions and methods described herein.

Embodiment 1 is a stabilized layered lithium metal oxide material comprising microparticles of a LMO of empirical formula $LiMO_2$, wherein M comprises a Ni, Mn, Co, or a combination of two or more thereof, and optionally one or more additional metal element, M'; the individual microparticles comprise a core of a first layered LMO of formula $LiM'_w Ni_x Mn_{y+e} Co_{z+f} O_2$ and a 50 to 2000 nm thick coating of a second LMO of formula $LiMn_b Co_c M'_d O_2$ surrounding the core, wherein $0 \le b \le 1$; $0 \le c \le 1$; $0 \le d \le 1$; $b+c+d=1$; $0 \le w \le 0.05$; $0 \le x \le 1$; $0 \le y \le (1-e)$; $0 \le z \le (1-f)$; $0 \le e \le 0.2b$; $0 \le f \le 0.5c$; $0 \le w \le 0.5d$; $w+x+y+z+e+f=1$; there is an interface region of a third LMO composition between the core and the coating comprising a blend of metal oxides from the core and the coating; the interface region has a thickness of about 50 to about 2000 nm; the concentrations of M', Ni, Mn, and Co in the interface region vary in the direction from surface to core; the Ni and Co concentrations are substantially uniform within the core when x and z are greater than 0, and the Mn concentration of the core can vary by up to about +/−5 percent in nested concentric regions within the core when y and c are greater than 0.

Embodiment 2 comprises the stabilized layered LMO material of embodiment 1, wherein M' is selected from the group consisting of Al, Ti, Zr, and Mg.

Embodiment 3 comprises the stabilized layered LMO material of embodiment 1 or 2, wherein $0 \le b \le 0.6$; $0 \le c \le 1$; and $0 \le d \le 1$.

Embodiment 4 comprises the stabilized layered LMO material of any one of embodiments 1 to 3, wherein $0 \le w \le 0.02$; $0.6 \le x \le 1$; $0 \le y \le 0.2$; and $0 \le z \le 0.2$.

Embodiment 5 comprises the stabilized layered LMO material of any one of embodiments 1 to 4, wherein the microparticles have an average particle size in the range of about 6 to about 15 μm.

Embodiment 6 comprises the stabilized layered LMO material of any one of embodiments 1 to 5, wherein d and w are both 0.

Embodiment 7 is a stabilized layered LMO material comprising microparticles of a lithium nickel manganese cobalt oxide (NMC) of formula $LiMO_2$, wherein M comprises a combination of Ni, Mn, and Co; the microparticles comprise a core of a first layered LMO of formula $LiNi_x Mn_{y+h} Co_{z+k} O_2$, and a 50 to 2000 nm thick coating of a second layered LMO of formula $LiMn_g Co_{1-g} O_2$ surrounding the core, wherein $0 \le g \le 1$; $0 \le x \le 1$; $0 \le y \le 1$; $0 \le z \le 1$; $0 \le h \le 0.5g$; $0 \le k \le 0.5(1-g)$; $h+k+x+y+z=1$; there is an interface region of NMC between the core and the coating; the interface region has a thickness of about 50 to about 2000 nm; the Ni concentration of the interface region increases in the direction from surface to core, while the Mn and Co concentrations of the interface region decrease in the direction from surface to core when g>0 and h>0; the Ni and Co concentrations are substantially uniform within the core, and the Mn concentration of the core can vary by up to about +/−5 percent in nested concentric regions within the core when h>0.

Embodiment 8 comprises the stabilized layered LMO material of embodiment 7, wherein the microparticles have an average particle size in the range of about 6 to about 15 μm.

Embodiment 9 comprises the stabilized layered lithium metal oxide material of embodiment 7 or 8, wherein the coating has a thickness in the range of about 100 to about 500 nm.

Embodiment 10 comprises the stabilized layered LMO material of any one of embodiments 7 to 9, wherein $0 \leq g \leq 0.6$.

Embodiment 11 comprises the stabilized layered LMO material of any one of embodiments 7 to 10, wherein $0.6 \leq x < 1$; $0 < y \leq 0.2$; and $0 < z \leq 0.2$.

Embodiment 12 is a method for preparing a stabilized layered LMO material comprising the sequential steps of:

(a) continuously adding an aqueous solution of an alkali metal hydroxide (e.g., NaOH, KOH, and the like), aqueous ammonium hydroxide, and an aqueous solution of metal salts comprising a nickel salt, a manganese salt, a cobalt salt, or a combination of two or more thereof, to a stirring reactor at a temperature of about 25 to 60° C., at hydroxide addition rates sufficient to maintain a constant pH of greater than or equal to 11, thereby coprecipitating metal hydroxide core precursor particles; and halting the additions of the solutions when the average particle size of the core precursor particles reaches a selected target size;

(b) continuously adding an aqueous coating solution comprising a manganese salt, a cobalt salt, or a combination thereof, to a stirring slurry of the core precursor particles formed in step (a) without addition of any hydroxide and without controlling the pH, at a temperature of about 25 to 60° C.; thereby coprecipitating cobalt and manganese hydroxide on the surface and interior of the core precursor particles to form coated precursor particles; and halting addition of the coating solution when the pH drops by a selected target level of about 0.1 to 1 pH units;

(c) recovering the coated precursor particles;

(d) mixing the recovered coated precursor particles with at least one molar equivalent of lithium hydroxide relative to the total moles of metal hydroxide in the coated precursor particles to produce a precursor mixture; and (e) calcining the precursor mixture from step (d) at a temperature in the range of about 725 to 900° C. for about 4 to 50 hours, to form the stabilized lithium metal oxide material.

Embodiment 13 comprises the method of embodiment 12, wherein the constant pH in step (a) is in the range of about 11.5 to 12.

Embodiment 14 comprises the method of embodiment 12 or 13, wherein the target particle size in step (a) is in the range of about 6 to about 15 μm.

Embodiment 15 comprises the method of any one of embodiments 12 to 14, wherein the aqueous solution of metal salts in step (a) comprises a ratio of Ni:Mn:Co of about x:y:z and the solution of manganese and cobalt salts in step (b) comprises a ratio of Mn:Co of about g:(1−g); $0 \leq g \leq 1$; $0 \leq x \leq 1$; $0 \leq y \leq 1$; $0 \leq z \leq 1$; and $x+y+z=1$.

Embodiment 16 comprises the method of embodiment 15, wherein $0 \leq g \leq 0.6$; $0.6 \leq x \leq 1$; $0 \leq y \leq 0.2$; and $0 \leq z \leq 0.2$.

Embodiment 17 comprises the method of any one of embodiments 12 to 16, wherein the aqueous coating solution in step (b) further comprises an additional salt of a metal, M'.

Embodiment 18 comprises the method of any one of embodiments 12 to 17, wherein step (a) is performed in a continuous stirred tank reactor.

Embodiment 19 comprises the method of embodiment 18, wherein step (b) is performed in one or more stirred batch reactors.

Embodiment 20 is an electrochemical cell comprising an anode, a cathode comprising the lithium metal oxide material of any one of embodiments 1 to 11, an ion-conductive separator between the anode and the cathode, and an electrolyte comprising a lithium salt dissolved in a non-aqueous solvent contacting the anode, the cathode, and the separator.

Embodiment 21 is a battery comprising a plurality of the electrochemical cells of embodiment 20 electrically connected in series, in parallel, or in both series and parallel.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

A coating of coprecipitated metal hydroxide (e.g., Mn/Co hydroxide) can be formed on coprecipitated metal hydroxide (e.g., Ni—Mn—Co hydroxide) core particles, during which a small amount of metal hydroxide (e.g., Mn and Co hydroxide) precipitates inside the core particles, which are porous. This is achieved by allowing the pH in the reactor to fall during addition of the coating solution to the previously coprecipitated metal hydroxide core particles. Examination of a Mn/Co hydroxide coating on a Ni—Mn—Co hydroxide core indicates that there is high concentration of Co and Mn on the particle surface; however, Mn also penetrates deeply into the precursor particle and precipitates in tree ring like concentric bands, layers or regions within the particles, so that the Mn concentration varies up and down slightly along the radius of the particles. The metal distribution in the core and the coating is substantially maintained after calcining the coated metal hydroxide particles with lithium hydroxide to form a coated LMO product. This coating and perhaps the Mn concentration variations in the coated LMO improve the cycling performance and the thermal stability of the coated LMO product when used as a cathode material.

Breakdown of the coated LMO material under simulated runaway cathode overheating conditions occurs continuously, unlike the breakdown of uncoated materials, which undergo surface breakdown before the decomposition proceeds into the bulk. Beyond being able to make a coating of Co and Mn oxide, this technique can also be used to create coatings of other materials, such as Al oxide or Ti oxide. Through pH control, the precipitation can be targeted to specific regions inside the particles. This opens up possibilities for complex particle engineering without requiring the added costs of batch processing. Improving the cathode material performance without compromising safety or increasing costs can reduce the overall costs of battery systems.

As used herein, the term "continuous stirred-tank reactor" (CSTR), also known as a "mixed flow reactor", or a "continuous-flow stirred-tank reactor," refers to a tank reactor with one or more inlet for adding a reactant solutions, a stirring apparatus, and an outlet from which contents of the reactor tank flows. During operation, the flow rates of the inlets and outlets are controlled so that a selected residence time in the tank can be achieved, while allowing the reactor to operate in a continuous fashion for much longer than the residence time. The CSTR operates on a steady-state basis so that the conditions in the reactor can be kept substantially constant, with very efficient mixing. CSTRs are well known in the chemical engineering arts.

In electrochemical cell and battery embodiments described herein, the electrolyte comprises an electrolyte salt (e.g., an electrochemically stable lithium salt or a sodium salt) dissolved in a non-aqueous solvent. Any lithium electrolyte salt can be utilized in the electrolyte compositions for lithium electrochemical cells and batteries described herein, such as the salts described in Jow et al. (Eds.), *Electrolytes for Lithium and Lithium-ion Batteries*; Chapter 1, pp. 1-92; Springer; New York, N.Y. (2014), which is incorporated herein by reference in its entirety.

Non-limiting examples of lithium salts include, e.g., lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiDCTA), lithium trifluoromethanesulfonate (LiTf), lithium perchlorate (LiClO$_4$), lithium bis(oxalato)borate (LiB(C$_2$O$_4$)$_2$ or "LiBOB"), lithium difluoro(oxalato)borate (LiF$_2$BC$_2$O$_4$ or "LiDFOB"), lithium tetrafluoroborate (LiBF$_4$), lithium hexafluorophosphate (LiPF$_6$), lithium hexafluoroarsenate (LiAsF$_6$), lithium thiocyanate (LiSCN), lithium bis(fluorosulfonyl)imidate (LiFSI), lithium bis(pentafluoroethylsulfonyl)imidate (LiBETI), lithium tetracyanoborate (LiB(CN)$_4$), lithium nitrate, combinations of two or more thereof, and the like. The lithium salt can be present in the electrolyte solvent at any concentration suitable for lithium battery applications, which concentrations are well known in the secondary battery art. As used herein the term "lithium battery" refers to electrochemical cells and combinations of electrochemical cells in which lithium (e.g., lithium ion) shuttles between an anode and a cathode, and includes so-called full cells with an anode material (e.g., graphite) that can accommodate intercalated lithium ions, as well as so-called half-cells in which the anode is lithium metal. In some embodiments, the lithium salt is present in the electrolyte at a concentration in the range of about 0.1 M to about 5 M, e.g., about 0.5 M to 2 M, or 1 M to 1.5M. A preferred lithium salt is LiPF$_6$.

The non-aqueous solvent for the electrolyte compositions include the solvents described in Jow et al. (Eds.), *Electrolytes for Lithium and Lithium-ion Batteries*; Chapter 2, pp. 93-166; Springer; New York, N.Y. (2014), which is incorporated herein by reference in its entirety. Non-limiting examples of solvents for use in the electrolytes include, e.g., an ether, a carbonate ester (e.g., a dialkyl carbonate or a cyclic alkylene carbonate), a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone. For example, the solvent can comprise an ether (e.g., glyme or diglyme), a linear dialkyl carbonate (e.g., dimethyl carbonate (DMC), diethyl carbonate (DEC), ethyl methyl carbonate (EMC) and the like), a cyclic alkylene carbonate (ethylene carbonate (EC), propylene carbonate (PC) and the like), a sulfolane (e.g., sulfolane or an alkyl-substituted sulfolane), a sulfone (e.g., a dialkyl sulfone such as a methyl ethyl sulfone), a fluoro-substituted linear dialkyl carbonate, a fluoro-substituted cyclic alkylene carbonate, a fluoro-substituted sulfolane, and a fluoro-substituted sulfone. The solvent can comprise a single solvent compound or a mixture of two or more solvent compounds.

In some embodiments, the non-aqueous solvent for a lithium electrochemical cell as described herein can be an ionic liquid. Any electrochemically stable ionic liquid solvent can be utilized in the electrolytes described herein, such as the solvents described in Jow et al. (Eds.), *Electrolytes for Lithium and Lithium-ion Batteries*; Chapter 4, pp. 209-226; Springer; New York, N.Y. (2014), which is incorporated herein by reference in its entirety. In the case of lithium electrochemical cells and batteries, the ionic liquid can optionally include a lithium cation, and can act directly as the electrolyte salt.

The electrolyte compositions for lithium electrochemical cells and batteries described herein also can optionally comprise an additive such as those described in Jow et al. (Eds.), *Electrolytes for Lithium and Lithium-ion Batteries*; Chapter 3, pp. 167-182; Springer; New York, N.Y. (2014), which is incorporated herein by reference in its entirety. Such additives can provide, e.g., benefits such as SEI, cathode protection, electrolyte salt stabilization, thermal stability, safety enhancement, overpotential protection, corrosion inhibition, and the like. The additive can be present in the electrolyte at any concentration, but in some embodiments is present at a concentration in the range of about 0.0001 M to about 0.5 M. In some embodiments, the additive is present in the electrolyte at a concentration in the range of about 0.001 M to about 0.25 M, or about 0.01 M to about 0.1 M.

The stabilized LMO cathode materials described herein are useful as electrode active materials for Li-ion electrochemical cells and batteries. Cathodes (positive electrodes) typically are formed by combining a powdered mixture of the active material and some form of carbon (e.g., carbon black, graphite, or activated carbon) with a binder such as (polyvinylidene difluoride (PVDF), carboxymethylcellulose, and the like) in a solvent (e.g., N-methylpyrrolidone (NMP) or water) and the resulting mixture is coated on a conductive current collector (e.g., aluminum foil) and dried to remove solvent and form an active layer on the current collector.

Anodes (negative electrodes) also typically will be lithium metal (e.g., in a lithium half-cell) or more commonly will include some form of carbon (e.g., carbon black, graphite, or activated carbon), optionally in combination with another anode active materials such as Si. The carbon is mixed with a binder such as polyvinylidene difluoride (PVDF), carboxymethyl cellulose, and the like) in a solvent (e.g., NMP or water) and the resulting mixture is coated on a conductive current collector (e.g., copper foil) and dried to remove solvent and form an active layer on the current collector.

Electrochemical cells typically comprise a cathode containing the stabilized LMO materials described herein, an anode typically comprising carbon, silicon, lead, metallic lithium, some other anode active material, or a combination thereof; and a porous separator between the cathode and anode, with the electrolyte in contact with the anode, the cathode and the separator. A battery can be formed by electrically connecting two or more such electrochemical cells in series, parallel, or a combination of series and parallel. The electrodes described herein preferably are utilized as the anode in a full-cell configuration in lithium-ion and sodium-ion cells and batteries. Electrochemical cells and battery designs and configurations, anode and cathode materials, as well as electrolyte salts, solvents and other battery or electrode components (e.g., separator membranes, current collectors), which can be used in the electrolytes, cells and batteries described herein, are well known in the secondary battery art, e.g., as described in "Lithium Batteries Science and Technology" Gholam-Abbas Nazri and Gianfranco Pistoia, Eds., Springer Science+Business Media, LLC; New York, N.Y. (2009), which is incorporated herein by reference in its entirety.

Processes used for manufacturing lithium cells and batteries are well known in the art. The active electrode materials are coated on both sides of metal foil current collectors (typically copper for the anode and aluminum for the cathode) with suitable binders such as polyvinylidene difluoride and the like to aid in adhering the active materials to the current collectors. In the cells and batteries described herein, the cathode active material is the stabilized NMC, which optionally can be utilized with a carbon material such as graphite, and the anode active material typically is a lithium metal, carbon, and the like. Cell assembly typically is carried out on automated equipment. The first stage in the assembly process is to sandwich a separator between the anode and the cathode. The cells can be constructed in a stacked structure for use in prismatic cells, or a spiral wound structure for use in cylindrical cells. The electrodes are connected to terminals and the resulting sub-assembly is inserted into a casing, which is then sealed, leaving an opening for filling the electrolyte into the cell. Next, the cell is filled with the electrolyte and sealed under moisture-free conditions.

Once the cell assembly is completed, the cell typically is subjected to at least one controlled charge/discharge cycle to activate the electrode materials and in some cases form a solid electrolyte interface (SEI) layer on the anode. This is known as formation cycling. The formation cycling process is well known in the battery art and involves initially charging with a low voltage (e.g., substantially lower that the full-cell voltage) and gradually building up the voltage. The SEI acts as a passivating layer which is essential for moderating the charging process under normal use. The formation cycling can be carried out, for example, according to the procedure described in Long et al. *J. Electrochem. Soc.*, 2016; 163 (14): A2999-A3009, which is incorporated herein by reference in its entirety. This procedure involves a 1.5 V tap charge for 15 minutes at C/3 current limit, followed by a 6-hour rest period, and then 4 cycles at C/10 current limit, with a current cutoff (i≤0.05 C) at the top of each charge.

Cathodes comprising the stabilized LMO described herein can be utilized with any combination of anode and electrolyte in any type of rechargeable battery system that utilizes a non-aqueous electrolyte.

The following non-limiting Examples are provided to illustrate certain features of the compositions and methods described herein.

Example 1. Preparation of NMC811 and Coated NMC811

NMC 811 hydroxide core precursor was made using a 4 L CSTR (Pope Scientific) using 2 M aqueous 8:1:1 $Ni(SO_4)$:$Mn(SO_4)$:$Co(SO_4)$, 4 M aqueous sodium hydroxide solution and 4 M aqueous ammonium hydroxide solution. These solutions were pumped into the reactor to maintain an ammonium hydroxide-to-transition metal ratio of about 0.95 and a pH of about 11.9 at about 50° C. The residence time was approximately 4 hr. The reaction was run for 28 hr before the hydroxide additions were stopped. A coating was then applied by pumping a 2 M 1:1 $Mn(SO_4)$:$Co(SO_4)$ aqueous solution (Mn/Co solution) into the reactor, with no further addition of hydroxide, while maintaining stirring and temperature (50° C.) in the CSTR, but in a batch-like mode in which the product was not collected continuously. The pH naturally drops with the addition of the transition metal sulfate, and the addition of Mn/Co solution was stopped at a pH of 11.7, which takes about 15 to 30 minutes. Next, the resulting coated NMC hydroxide precursor was washed with DI water until the rinse water conductivity reached 10 µS/cm. The coated NMC hydroxide product was then filtered and dried under vacuum at 80° C., and finally sieved with a 45 µm sieve. The coated NMC hydroxide was then mixed with ground $LiOH.H_2O$ (FMC) and calcined at 775° C. for 50 hr in a flow of oxygen. The resulting coated NMC811 product was sieved at 45 µm.

Example 2. Preparation of NMC811 and Coated NMC811 Cathodes

Electrodes were then produced with a ratio of 93 percent by weight (wt %) stabilized NMC to 4 wt % TIMCAL C45 carbon black to 3 w. % poly(vinylidene difluoride) (PVDF) binder. Coin cells with a lithium metal anode, and a commercial made electrolyte comprising $LiPF_6$ salt, carbonate solvents and various additives. The cells were constructed in a glovebox under an atmosphere containing less than 1 ppm $H_2O$ and $O_2$. Cells, in triplicate, and were then cycled using a MACCOR cycler at 30° C.

Example 3. Structural Analysis of Coated NMC811

Scanning electron microscopy was performed using a PHENOM XL microscope. The precursors were coated with carbon before imaging to prevent charging. Transmission electron microscopy (TEM) energy dispersive X-ray spectroscopy (EDX) linescans and mapping were performed on focused ion beam (FIB) prepared samples with a gold sputter deposited and platinum ion beam deposited protective layer. The FIB prepared samples were analyzed in an FEI TALOS 200X TEM. Differential scanning calorimetry was done using the procedures reported previously using a NETZSCH 449 F3 JUPITER STA calorimeter. Variable temperature X-ray diffraction was performed at sector 13BM at the Advanced Photon Source at Argonne National Laboratory using a PILATUS detector (Dectris) at a frame rate of 25 Hz. The sample was heated using a flow of helium passed over a tungsten filament developed by the beamline scientists at 13BM. This enables the sample to be heated at about 1500° C./min to 450° C. The electrodes for these experiments were charged and then placed between glass cover slips with 5 µL of additional electrolyte, and then sealed with KAPTON tape. XRD patterns were extracted using DIOPTAS software, and the patterns were sequentially Rietveld refined using GSAS-II software. Temperature was measured by taking a linear fit of the temperature as predicted by the aluminum lattice parameter.

Figure 1:
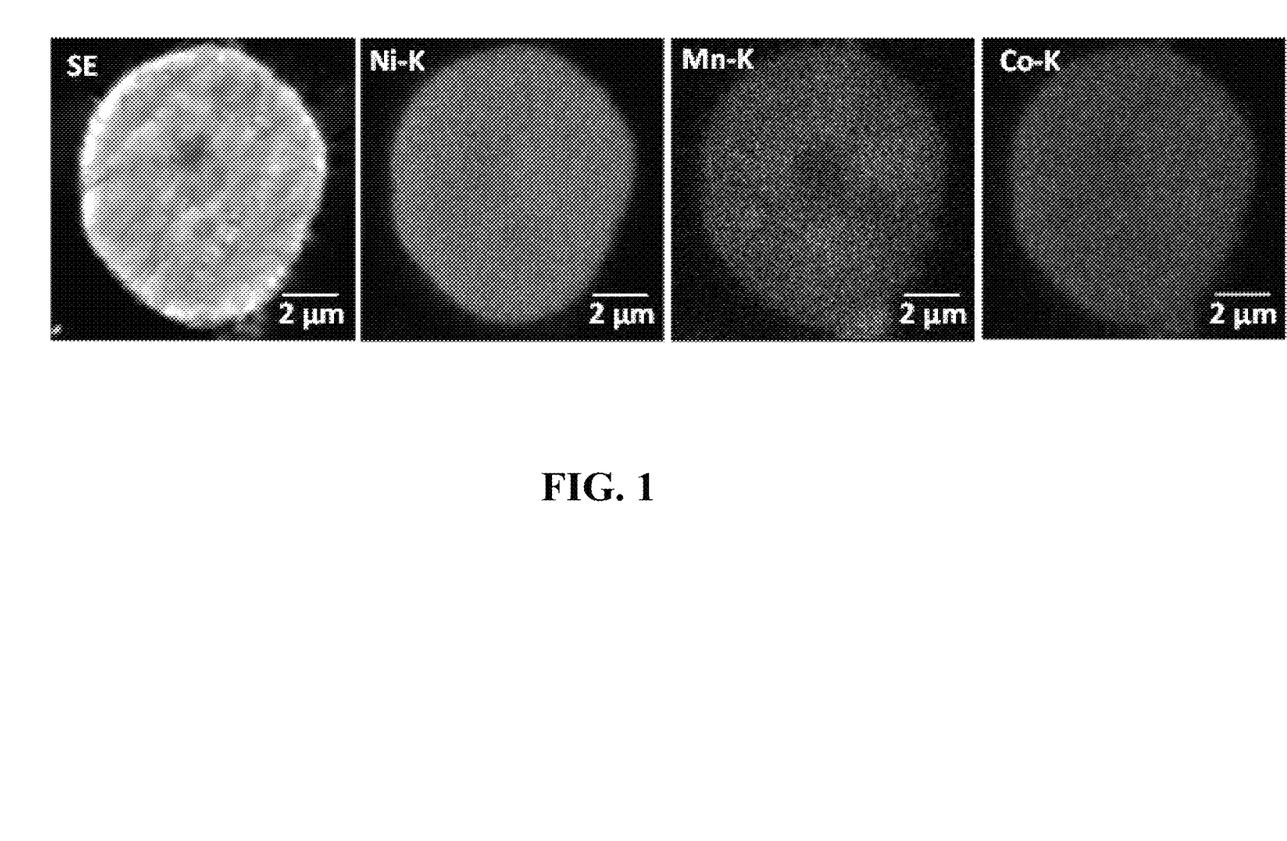
FIG. 1 shows an SEM image (left) and EDX elemental maps of a NMC hydroxide particle after coating with 1:1 Co:Mn hydroxide.

The process described herein begins the same way as standard coprecipitation, creating spherical precursor particles of the desired size. A coating is then applied by stopping the additions of sodium hydroxide and ammonium hydroxide, followed by adding a solution with the desired molar ratio of metal sulfates for the coating. This slowly reduces the pH of the reaction mixture as the metal sulfates react with the remaining ammonium hydroxide and sodium hydroxide present in the reaction mixture. The drop in pH can change how the materials are deposited onto the surface of the precursor particles. Unlike during typical coprecipitation where the highest pH is near where the hydroxides are added, in the process described herein, the pH is highest inside the already deposited metal hydroxide particles. This causes precipitation of coating metal hydroxides within the particles, rather than collecting exclusively at the surfaces. The overall result of these changes in pH can be seen by using energy dispersive X-ray spectroscopy elemental mapping of a cross-section. The resulting maps of a full particle using scanning electron microscopy are shown in FIG. 1 after a coating an NMC 811 hydroxide precursor using a 1:1 $Co(SO_4):Mn(SO_4)$ solution. Inductively coupled plasma mass spectrometry indicates that the coating process added only approximately 1.3 mol % of Co and 1.3 mol % of Mn to the particles. It is clear from the EDX that there are some particles of $Co_{0.5}Mn_{0.5}(OH)_2$ on the surface of the precursor. There is also a complex pattern of Mn deposition through the particle. There is an increase in Mn content between the surface and the core of the material. Along with that there are variations around the particle, which likely have to do with variations in porosity.

Figure 2:
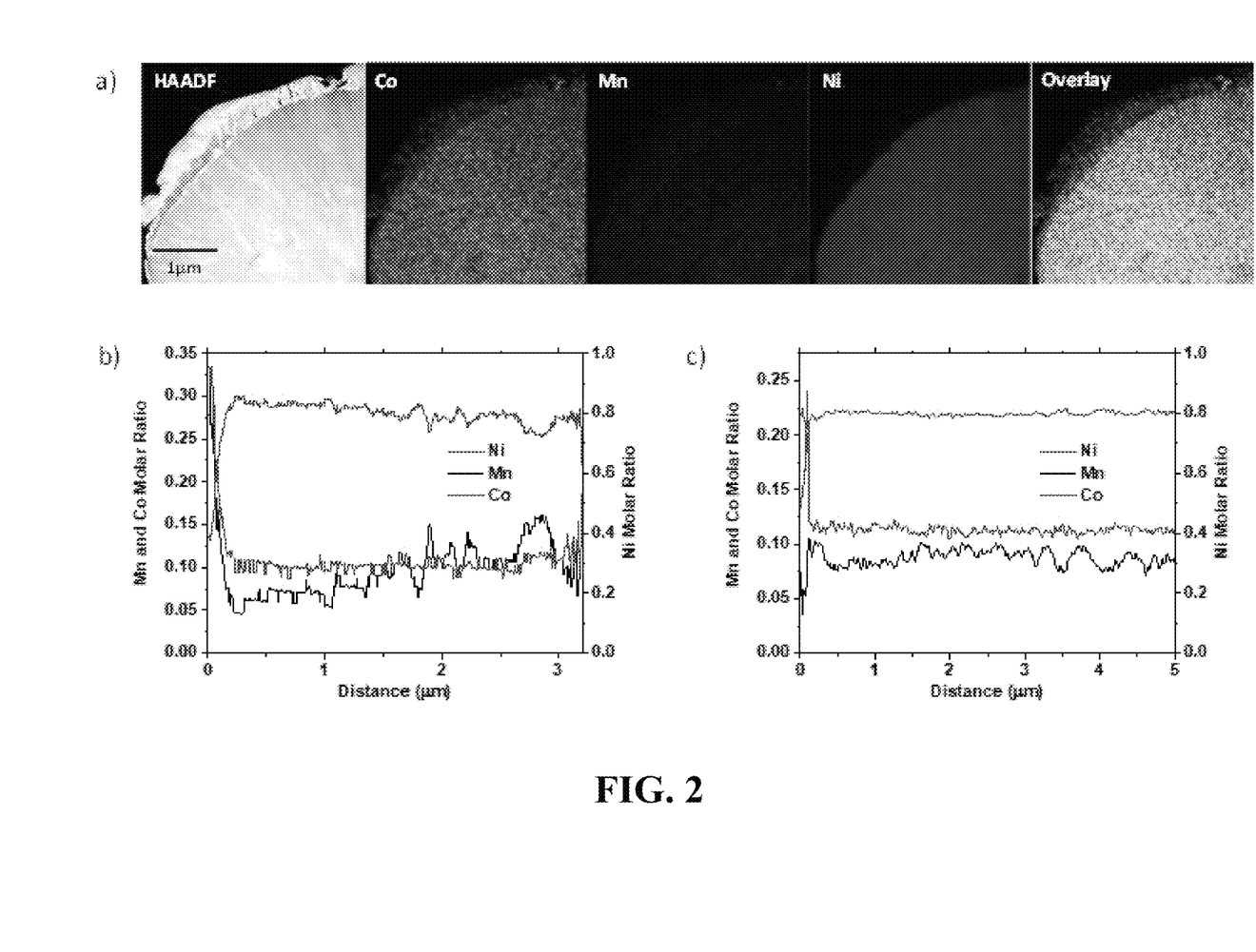
FIG. 2 shows (a) TEM-EDX cross-sectional imaging of a NMC hydroxide particle that has been coated with lithium cobalt manganese hydroxide; and normalized transition metal line scans from the surface to the center of (b) a coated NMC hydroxide particle; and (c) a coated NMC oxide particle.

To better understand where the coating is deposited, focused ion beam (FIB) cross-sectioned samples were made and imaged with TEM EDX mapping (FIG. 2) of a coated precursor NMC hydroxide particle. With the increased resolution, it is clear that there is a thin coating of $Co_{0.5}Mn_{0.5}(OH)_2$ on the surface of the material. Quantification indicates that the surface composition is approximately NMC 111 hydroxide (i.e., approximately $Ni_{1/3}Co_{1/3}Mn_{1/3}(OH)_2$), and then there is a gradient across a few hundred nanometers to the bulk composition. Additionally, there are apparent rings of Mn that appear like growth rings on a tree. After calcination it is more difficult to see these features in elemental maps, however, a quantitative linescan still shows evidence of these features if the calcination temperature is low enough. The combination of these features creates a surface with lower Ni content, and variations in Mn content along the radius that can have effects on the thermal stability and cycling performance of the material.

Figure 3:
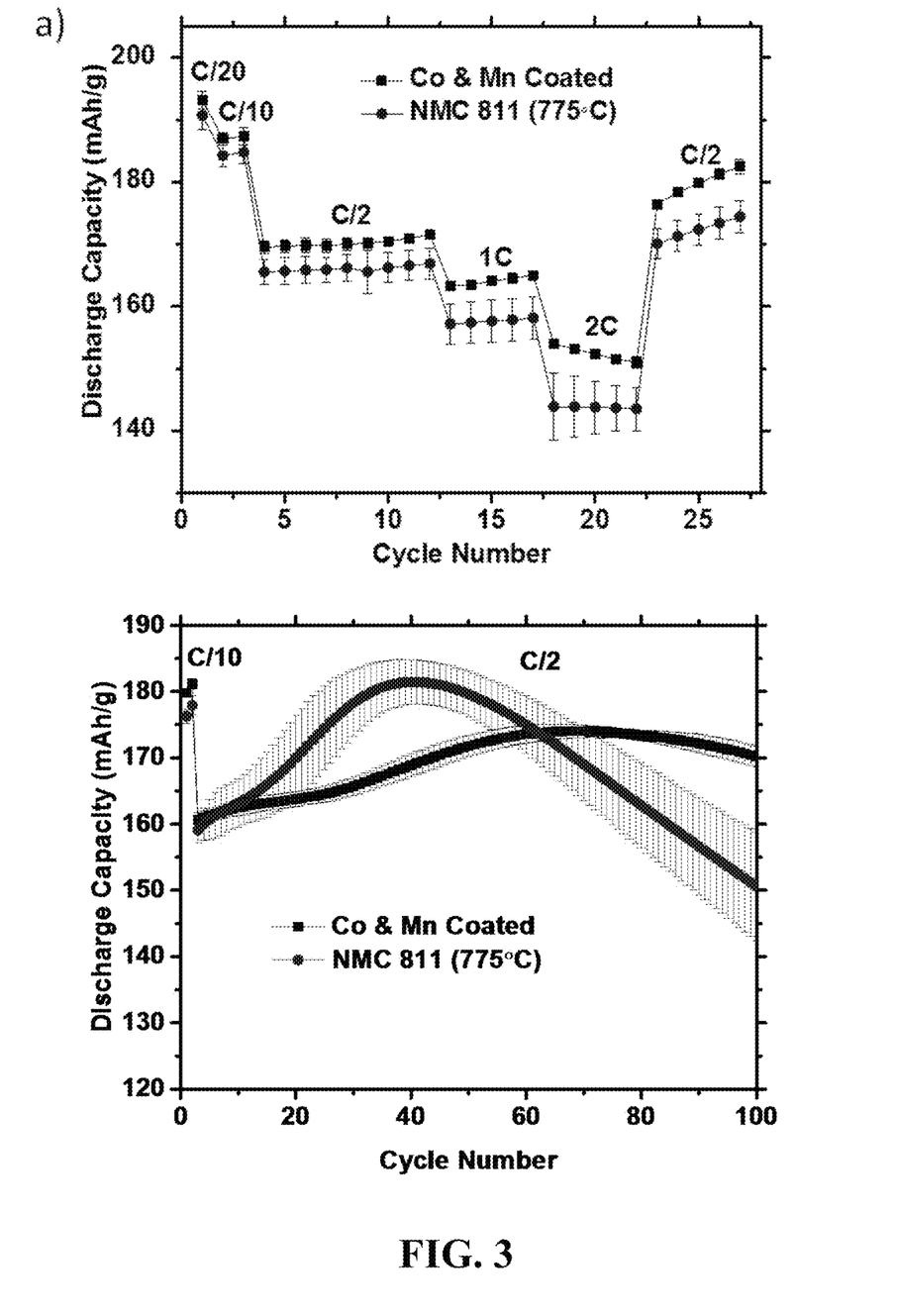
FIG. 3 shows electrochemical (a) rate performance and (b) cycling data between 2.7 V and 4.3 V at 30° C. for a lithium cobalt manganese oxide coated sample as compared to an NMC prepared without a coating using the same calcination conditions.

Example 4. Electrochemical Evaluation of NMC811 and Coated NMC811 Electrodes The cycling and rate performance of the coated NMC811 of Example 1 and uncoated NMC811 are shown in FIG. 3. Both pristine and coated materials show substantial ramping in the capacity, which is largely due to the reduced calcination temperature. However, the Co and Mn coated material shows significantly higher capacity and improved cycling performance. This can be associated with the improved interfacial stability due to the reduced Ni content on the surface. The additional gradients may also play a role in electrochemical performance.

Example 5. Safety Evaluation of the Coated NMC811 of Example 1

Figure 4:
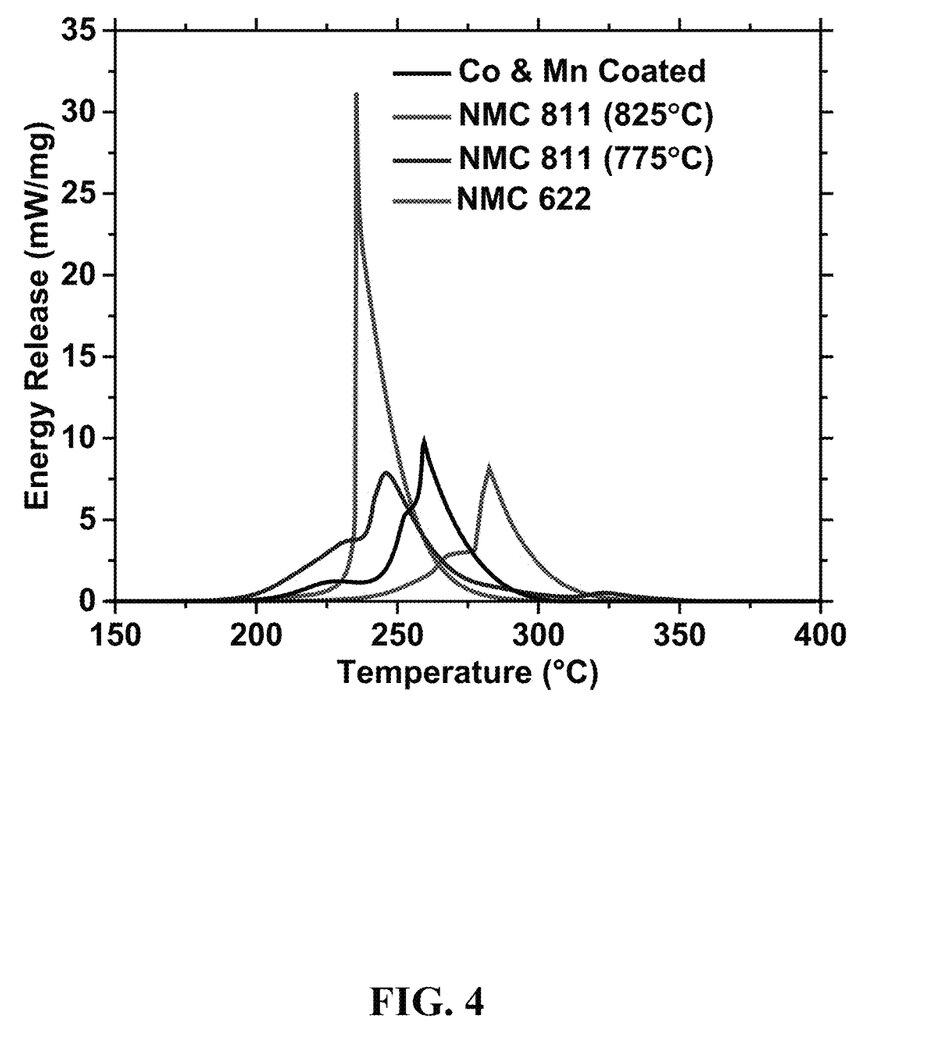
FIG. 4 shows DSC scans of electrodes charged to 4.3 V heated at a rate of 10° C./min.

One of the additional challenges with any cathode material is improving its safety characteristics by delaying heat and oxygen release. These properties can be studied by differential scanning calorimetry (DSC) and temperature dependent X-ray diffraction. DSC measurements of charged cathode materials are shown in FIG. 4. Standard NMC 811 breaks down in a very sharp peak at about 235° C. A lower temperature calcination reduces the peak intensity while broadening the peak, indicating a slower reaction. The coated NMC811 peak shifts to substantially higher temperatures. This change pushes the peak almost half-way between NMC 811 and NMC 622, with the Mn and Co content each increasing by only 1.3 mol % in the coated NMC811 relative to conventional NMC811.

Figure 5:
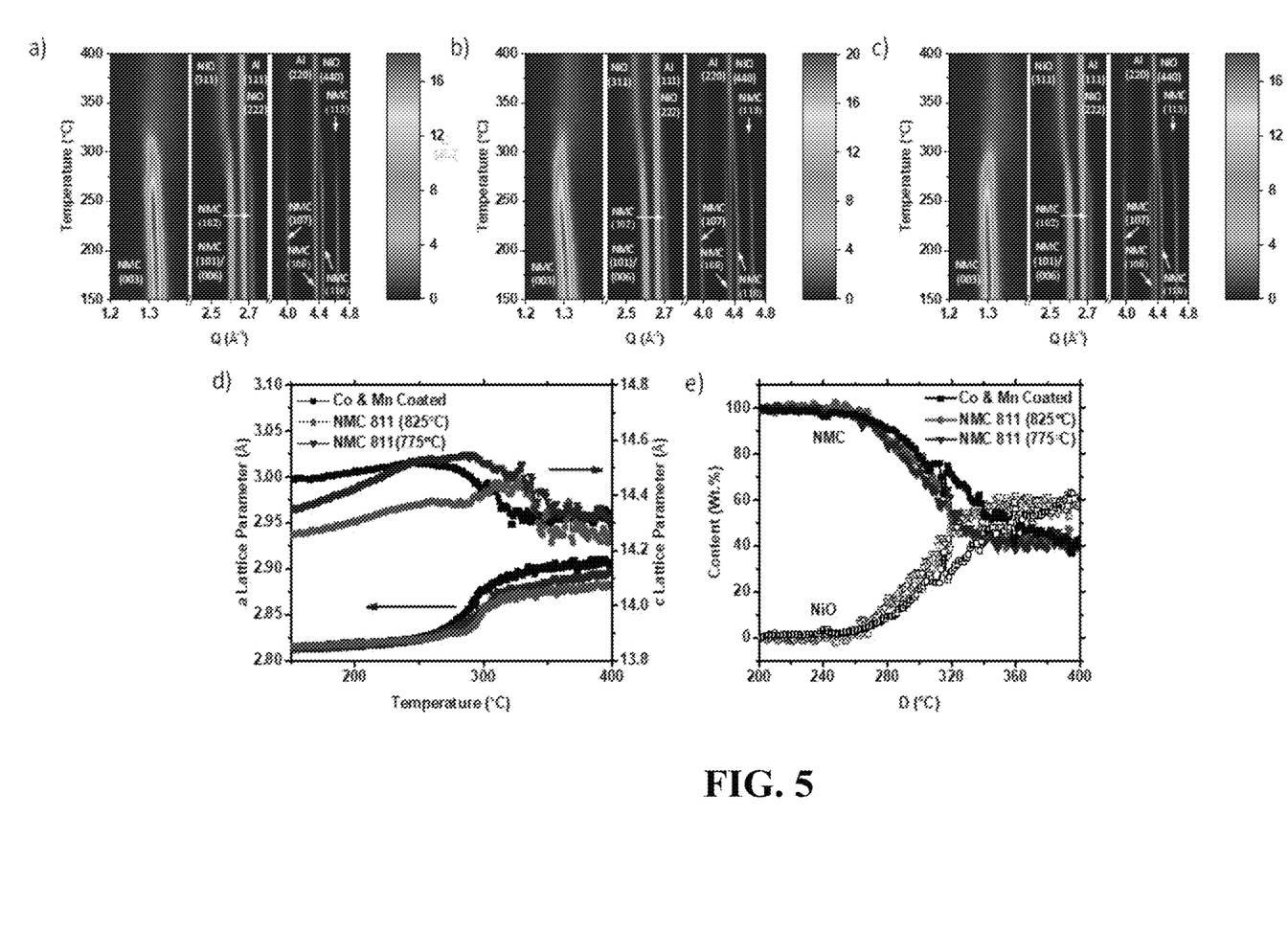
FIG. 5 shows synchrotron variable temperature X-ray diffraction during a simulated thermal runaway event for (a) NMC 811 calcined at 825° C., (b) NMC 811 calcined at 775° C. and (c) lithium cobalt manganese oxide coated NMC 811; as well as Rietveld refinement results of (d) the lithium NMC oxide a and c lattice parameters and (e) the calculated content of the NMC and NiO phases.

To understand how the coating process improves the decomposition of the layered NMC, we utilized variable temperature X-ray diffraction. In order to simulate the effects of a real thermal runaway event, charged cathode materials were subjected to rapid heating at a rate of approximately 1500° C./min. The resulting X-ray diffraction patterns, as a function of temperature, are shown in FIG. 5, Panels a-c. A careful examination of these patterns indicates some significant differences between the samples. NMC 811 calcined at 825° C. experiences two separate transitions to a rock salt phase (MO) as can be seen by the splitting of the NMC (101) and (006) peaks during the transition to the NiO (311). The transitions are likely an initial surface breakdown followed by a bulk breakdown at higher temperature. The NMC 811 calcined at lower temperature does not show clear splitting in the NMC (101) and (006) peaks. However, the NMC (003) peak does decrease in Q until about 250° C., and then there is a slight increase before another decline. This is an indication that the breakdown is still happening in a multi-stage manner, but it is less distinct. The material with the Co and Mn coating shows no evidence of this behavior with the NMC (003) peak decreasing continuously in Q with thermal expansion and then a direct increase during the breakdown process.

Sequential Rietveld refinement analysis can give additional insight into the breakdown process (FIG. 5 panels d and e). It should be noted that the model only assumes a single NMC material breaking down into a single NiO material. This means the refinement of the NMC lattice parameters will track the most intense peak. The initial transition begins at approximately 250° C. in all of the materials. Both the a and c NMC lattice parameters show multiple transitions in the uncoated materials; however, these features are less distinct in the 775° C. calcined sample. The a and c lattice parameters of the Co and Mn coated material transition smoothly to the final materials and mostly completes this transition before the uncoated materials. Monitoring the percentage of NMC and NiO present in the sample can give another indicator of the breakdown's progress. The uncoated NMC materials transition almost identically to each other. The coated material has a delay in the final formation process of the NiO phase. This data is consistent with the DSC where the start of heat release occurs at similar temperatures, but the full heat release of the coated material is delayed as compared to the uncoated materials. These differences indicate that the coated material slows the initial surface decomposition, and therefore the overall breakdown occurs more slowly.

Example 6. Electrochemical Cells and Batteries

Figure 6:
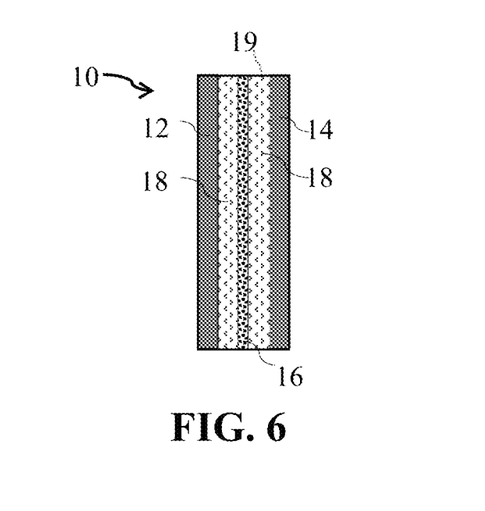
FIG. 6 depicts a schematic representation of an electrochemical cell.
Figure 7:
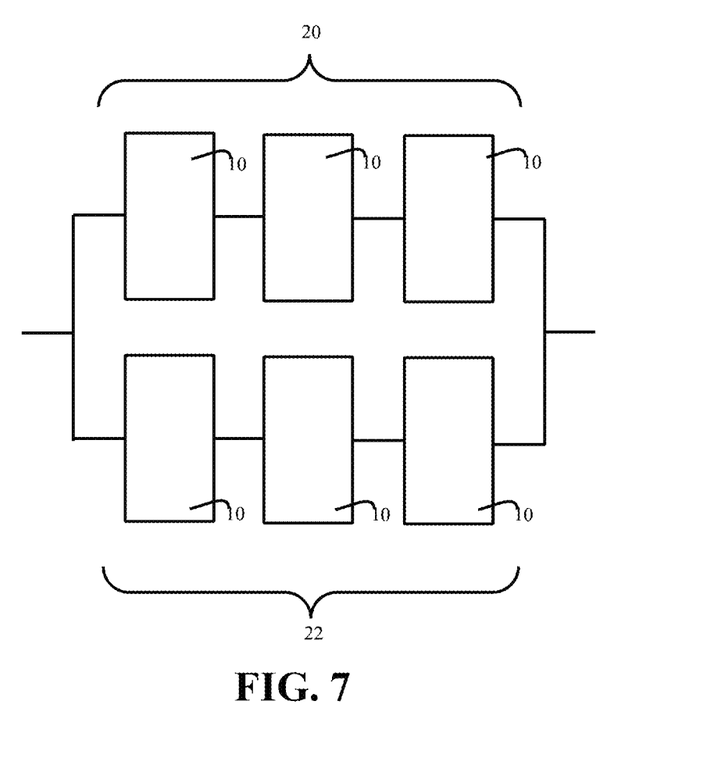
FIG. 7 depicts a schematic representation of a battery consisting of a plurality of cells connected electrically in series and in parallel.

FIG. 6 schematically illustrates a cross-sectional view of a lithium-ion electrochemical cell 10 comprising electrode 12, and electrode 14 comprising a stabilized LMO as described herein, with separator 16 therebetween. A lithium-containing electrolyte 18, comprising a solution of a lithium salt in a non-aqueous solvent, contacts electrodes 12 and 14 and separator 16. The electrodes, separator and electrolyte are sealed within housing 19. FIG. 7 schematically illustrates a lithium-ion battery comprising a first array 20 consisting of three series-connected electrochemical cells 10, and a second array 22 consisting of three series-connected electrochemical cells 10, in which first array 20 is electrically connected to second array 22 in parallel.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A stabilized layered lithium metal oxide (LMO) material comprising microparticles of a lithium metal oxide of empirical formula $LiMO_2$, wherein M comprises a Ni, Mn, Co, or a combination of two or more thereof, and optionally up to 5 mole percent of one or more additional metal element, M'; the individual microparticles comprise a core of a first layered LMO in which M comprises Ni, Mn, Co, or a combination of two or more thereof, and optionally M'; a 50 to 2000 nm thick coating of a second layered LMO in which M comprises Co, Mn, or a combination thereof, and optionally M', surrounding the core; and an interface region of a third layered LMO in which M comprises Ni, Co, Mn, or a combination of two or more thereof, and optionally M', between the core and the coating; wherein the interface region has a thickness of about 50 to about 2000 nm; the concentrations of M', Ni, Mn, and Co in the interface region vary in the direction from surface to core; the Ni and Co concentrations are substantially uniform within the core when the core comprises Ni and Co; and the Mn concentration of the core varies by up to about +/−5 percent in nested concentric regions within the core when the core comprises Mn and Co.

2. The stabilized layered LMO material of claim 1, wherein M' is selected from the group consisting of Al, Ti, Zr, and Mg.

3. The stabilized layered LMO material of claim 1, wherein the microparticles have an average particle size in the range of about 6 to about 15 µm.

4. The stabilized layered LMO material of claim 1, wherein M' is absent.

5. A stabilized layered lithium metal oxide (LMO) material comprising microparticles of a lithium nickel manganese cobalt oxide (NMC) of formula $LiMO_2$, wherein M comprises a combination of Ni, Mn, and Co; the microparticles comprise a core of a first layered LMO in which M comprises Ni, Mn, and Co; a 50 to 2000 nm thick coating of a second layered LMO in which M comprises Mn, Co, or a combination thereof surrounding the core; and an interface region of a third layered LMO in which M comprises Ni, Mn, and Co between the core and the coating; the interface region has a thickness of about 50 to about 2000 nm; the Ni concentration of the interface region increases in the direction from surface to core, while the Mn and Co concentrations of the interface region decrease in the direction from surface to core when the second LMO comprises Mn; the Ni and Co concentrations are substantially uniform within the core, and the Mn concentration of the core varies by up to about +/−5 percent in nested concentric regions within the core.

6. The stabilized layered LMO oxide material of claim 5, wherein the microparticles have an average particle size in the range of about 6 to about 15 μm.

7. The stabilized layered LMO material of claim 5, wherein the coating has a thickness in the range of about 100 to about 500 nm.

8. An electrochemical cell comprising an anode, a cathode comprising the lithium metal oxide material of claim 1, an ion-conductive separator between the anode and the cathode, and an electrolyte comprising a lithium salt dissolved in a non-aqueous solvent contacting the anode, the cathode, and the separator.

9. A battery comprising a plurality of the electrochemical cells of claim 8 electrically connected in series, in parallel, or in both series and parallel.

10. A stabilized layered lithium metal oxide (LMO) material comprising microparticles of a lithium metal oxide of empirical formula $LiMO_2$ wherein M comprises Ni, Mn, Co, or a combination of two or more thereof; wherein the microparticles comprise a core of a first layered LMO, a coating of a second layered LMO, and an interface layer of a third layered LMO between the core and the coating; and the stabilized layered lithium metal oxide material is prepared by a method comprising the sequential steps of:

(a) continuously adding an alkali metal hydroxide solution, an aqueous ammonium hydroxide solution, and an aqueous solution of metal salts to a stirring reactor at a temperature of about 25 to 60° C., at hydroxide addition rates sufficient to maintain a constant pH of greater than or equal to 11 in the reactor, thereby coprecipitating metal hydroxide core precursor particles; and halting the additions of the solutions when the average particle size of the core precursor particles reaches a selected target size; the metal salts comprising a nickel salt, a manganese salt, a cobalt salt, or a combination of two or more thereof;

(b) continuously adding an aqueous coating solution comprising a manganese salt, a cobalt salt, or a combination thereof, to a stirring slurry of the core precursor particles formed in step (a) without addition of any hydroxide and without controlling the pH, at a temperature of about 25 to 60° C.; thereby coprecipitating cobalt and manganese hydroxide on the surface and interior of the core precursor particles to form coated precursor particles; and halting addition of the coating solution when the pH drops by a selected target level of about 0.1 to 1 pH units;

(c) recovering the coated precursor particles;

(d) mixing the recovered coated precursor particles with at least one molar equivalent of lithium hydroxide relative to the total moles of metal hydroxides present in the coated precursor particles to produce a precursor mixture; and (e) calcining the precursor mixture from step (d) at a temperature in the range of about 725 to 900° C. for about 4 to 50 hours, to form the stabilized lithium metal oxide material.

11. The stabilized layered LMO material of claim 10, wherein the aqueous solution of metal salts in step (a) comprises a ratio of Ni:Mn:Co of x:y:z and the solution of manganese and cobalt salts in step (b) comprises a ratio of Mn:Co of g:(1−g); wherein $0 \leq g \leq 1$; $0 \leq x \leq 1$; $0 \leq y \leq 1$; $0 \leq z \leq 1$; and $x+y+z=1$.

12. The stabilized layered LMO material of claim 11, wherein $0.6 \leq x \leq 1$; $0 \leq y \leq 0.2$; $0 \leq z \leq 0.2$, and $0 \leq g \leq 0.6$.

13. The stabilized layered LMO material of claim 10, wherein the aqueous coating solution in step (b) further comprises a salt of an additional metal element, M'; and M' is selected from the group consisting of Al, Ti, Zr, and Mg.

* * * * *